Sept. 18, 1934.  A. P. ARMINGTON  1,974,230
DRIVING AXLE
Filed Dec. 26, 1933  2 Sheets-Sheet 2

INVENTOR
ARTHUR P. ARMINGTON
BY
Brockett, Hyde, Higley & Meyer
ATTORNEYS

Patented Sept. 18, 1934

1,974,230

UNITED STATES PATENT OFFICE 1,974,230

DRIVING AXLE

Arthur P. Armington, Willoughby, Ohio

Application December 26, 1933, Serial No. 703,872

13 Claims. (Cl. 74—287.5)

This invention relates to driving axles and more particularly contemplates a driving axle for a pair of wheels wherein differential means are employed to distribute the drive between wheels, and reducing gearing is arranged to be effective between the differential means and each wheel.

General objects of the invention are to produce an improved form of such an axle wherein the parts are so disposed and proportioned that the forces are best provided for and the parts most compactly yet accessibly arranged. Another object of the invention is to provide associated brake means for the wheels, the invention contemplating steering of the axle by selective braking on either side of its differential. Still another object of the invention is to provide that the working parts including the brakes are fully enclosed by the axle housing.

Figure 1:
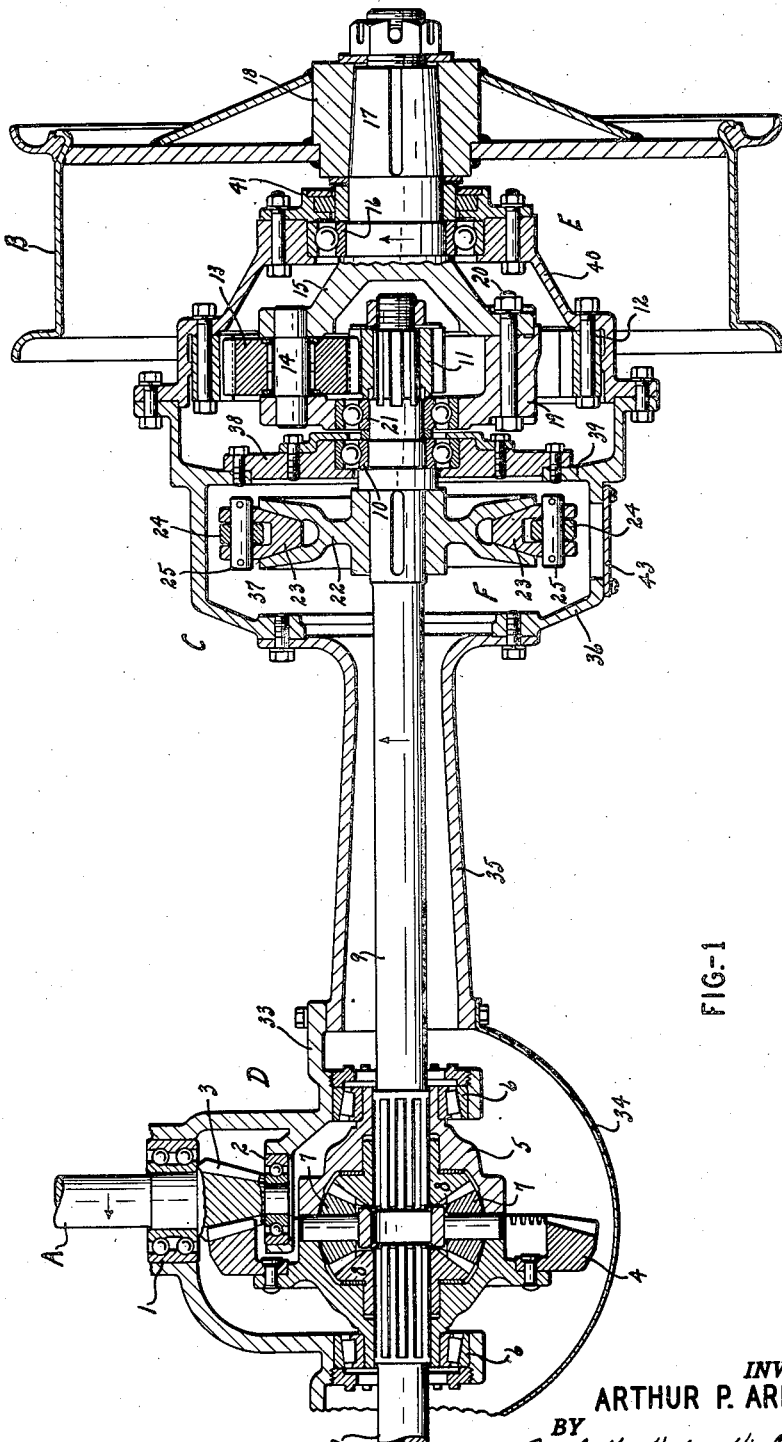
Figure 2:
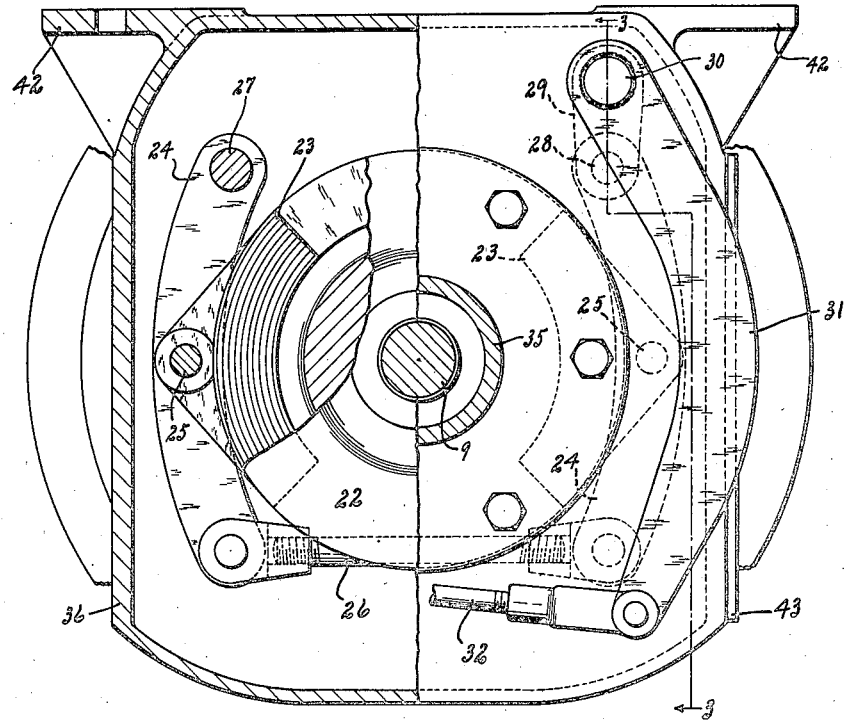
Figure 3:
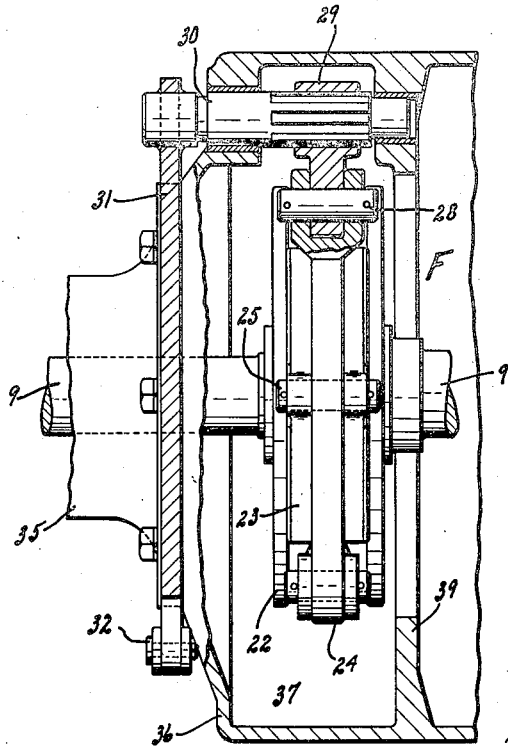

The exact nature of this invention together with further objects and advantages thereof will be apparent from the following description taken in connecton with the accompanying drawings, in which Fig. 1 is a sectional view in the central horizontal plane of the axle; Fig. 2 is an enlarged detail in vertical section transverse of the axle, showing parts of the brake for one wheel, parts being broken away to show details of construction; and Fig. 3 is a sectional detail of parts appearing in Fig. 2, as in the plane of line 3—3, Fig. 2.

With reference now to the drawings, A represents a drive shaft adapted for driven connection with the power means by which the axle is to be driven, and B represents the rim part of one of the wheels to have drive from the axle, it being understood that there are two wheels B, one at each end of the axle, one end of which does not appear specifically in the drawings. The principal parts of the axle are here generally designated as follows: a housing C; differential means D; reducing gearing E, one for each wheel B; and brake means F, one for each reducing gear E.

The drive shaft A bears in the housing C at 1 and 2, and carries therebetween a pinion 3 meshing with a ring gear 4. The ring gear is carried by a cage 5 having bearings in the housing at 6 and carrying a plurality of differential pinions 7. Each pinion 7 intermeshes with a pair of oppositely disposed driving gears 8 bearing in the cage 5. Each gear 8 is splined upon the inner end of a coupling shaft 9.

What has thus far been described will be recognized as generally representing the differential drive part of an automotive type of axle; the arrangement being one wherein the two coupling shafts 9 are in differentially driven relation with the drive shaft A, through a gear reduction provided by the pinion 3 and ring gear 4, the latter being identifiable as the input element of the differential of which the shafts 9 are output elements. The arrangement and relation of the parts between each wheel B and the differential D being identical in the axle with the exception of obvious left and right relation, it will suffice to here specifically describe only that for the right-hand wheel B which is shown in the drawings.

The coupling shaft 9 has a bearing in the housing C at 10 and extends slightly therebeyond where it carries a pinion 11. The pinion 11 is the center pinion of the reducing gearing E which is of planetary type and includes a ring gear 12 secured in the housing C as indicated, and a plurality of planet pinions 13, three of the latter being indicated, spaced about the center pinion, each meshing with both the center pinion and ring gear.

Each pinion 13 is carried upon a stub shaft 14 which forms part of a frame including a member 15 having a bearing at 16 in the housing C and extending therebeyond as at 17 to carry the hub part 18 of the wheel B. It will be noted that the bearing 16 is located in the central plane of the wheel B. Each stub shaft 14 is supported at its opposite end in a spider member 19 of the frame, bolted to the member 15 thereof as at 20 and having a bearing on the coupling shaft 9 as at 21 between the center pinion 11 and the bearing 10 of the coupling shaft in the housing.

The essential elements of the reducing gear E will be recognized as an input element, the center pinion 11 in driven relation with the coupling shaft 9, a fixed element, the ring gear 12 secured in the housing C, and an output element in driving relation with the wheel B, and exemplified by the member 15. It will be apparent that forward rotation of the coupling shaft 9 will cause forward rotation of the wheel B but at much reduced speed, the planet pinions 13 rotating rearwardly on their axes but progressing bodily forwardly.

Secured on the coupling shaft 9 adjacent its bearing 10 in the housing C, is a brake wheel 22, here shown as having a V face, cooperative with which is a pair of brake shoes 23, each pivotally mounted upon a lever 24 as by a pin 25. The lower ends of the brake levers 24 are interconnected by a link 26 made longitudinally adjustable as indicated in Fig. 2. One of the brake levers 24 is pivotally mounted on the housing C as by a fixed pin 27. The corresponding end of the other brake lever 24 is mounted as by a pin 28 upon an arm 29 secured upon a shaft 30 bearing in the housing C as indicated in Fig. 3, and extending therebeyond for connection with a brake-actuating lever 31. This brake-actuating lever has connection as by a pull rod 32 extending to suitable control means convenient to the operator.

It will be apparent that application of the brake means F will be accomplished by the pull rod 32 to effect bearing of both brake shoes 23 against the brake wheel 22; this braking being effective upon the wheel B by way of the reducing gearing E with consequent great advantage upon the wheel.

The housing C is made in several parts bolted together to improve ease of assembly and accessibility as follows:

At the differential D an integral member 33 is employed to receive all the bearings of the differential working parts, the rear end being closed by a light part 34. Leading outwardly about the coupling shaft 9 is a tubular member 35 connecting with an enlarged member 36 which forms a cavity 37 for the brake means F. A member 38 secured with a flange 39 on the housing part 36, carries the bearing 10 for the shaft 9. The member 38 may be a plate as here shown, completing the housing of the brake means F and its separation from the reducing gear E. Or this member might be in the form of a spider, permitting transfer of lubricant, with cooling effect, between brake F and gear E. The opening within the flange 39 is sufficiently large to permit withdrawal of the brake wheel 22 therethrough. The housing member 40, which carries the ring gear 12 is secured to the housing member 36 as indicated and carries the bearing 16 for the wheel-carrying frame, a housing part 41 serving to secure the outer ball race of this bearing.

All of the described housing parts are bolted together, as indicated in Fig. 1 of the drawings although not individually described. All, at their joinders, are preferably circular in section transverse to the general axis and concentric therewith; and the individual housing parts are at their joinders, provided with the annular shoulders, lips, etc., illustrated, by which their alignment is insured.

It will be noted that the opening in the frame spider part 19 at the bearing 21 is of size relative to the center pinion 11 to permit removal of the frame, as an assembled unit and including the planet pinions 13, without removal of the center pinion. Also the end housing part carrying the ring gear 12 and the hub part 18 of the axle, is separable from the remaining housing part; so that removal of this end housing part includes removal as a unit, of the wheel B, the frame, the ring gear, and so forth, and permits immediate accessibility to all reducing gear working parts.

As indicated in Fig. 2, the housing part 36 about the brake means F may be provided with pads 42 upon which the load to be supported by the axle may be mounted, and is provided with an opening, covered as at 43, permitting access to the brake means for inspection and adjustment.

What I claim is:

1. In a driving axle for a pair of wheels and having a housing, driving means, and for each wheel a planetary reducing gear enclosed by said housing and having a center pinion, a ring gear fixed in said housing, and a planet pinion effective between said center pinion and ring gear, a coupling shaft from said driving means, carrying said center pinion and having thereadjacent a bearing in said housing, a frame carrying said wheel and said planet pinion and having a bearing in said housing and a bearing on said coupling shaft between the said bearing of the latter in said housing and said center pinion.

2. In a driving axle for a pair of wheels and having a housing, for each wheel a planetary reducing gear carried by said housing and having a center pinion, a ring gear fixed in said housing, and a planet pinion effective between said center pinion and ring gear, shaft means carrying said center pinion and having thereadjacent a bearing in said housing, a frame carrying said wheel and said planet pinion and having a bearing on said shaft means between the said bearing of the latter in said housing and said center pinion, and means for simultaneously driving both said shaft means.

3. In a driving axle for a pair of wheels and having a housing, for each wheel a planetary reducing gear carried by said housing and having a center pinion, a ring gear fixed in said housing, and a planet pinion effective between said center pinion and ring gear, shaft means carrying said center pinion and having thereadjacent a bearing in said housing, a frame carrying said wheel and said planet pinion and having a bearing on said shaft means between the said bearing of the latter in said housing and said center pinion, and means for simultaneously driving both said shaft means, each said shaft means having associated brake means therefor.

4. In a driving axle for a pair of wheels and having a housing, driving differential means, and for each wheel a planetary reducing gear enclosed by said housing and having a center pinion, a ring gear fixed in said housing, and a planet pinion effective between said center pinion and ring gear, a couping shaft from said driving differential, carrying said center pinion and having thereadjacent a bearing in said housing, a frame carrying said wheel and said planet pinion and having a bearing in said housing and a bearing on said coupling shaft between the said bearing of the latter in said housing and said center pinion, each said coupling shaft having associated brake means effective thereon between its said reducing gear and said driving differential means.

5. In a driving axle for a pair of wheels and having a housing, for each wheel a planetary reducing gear carried by said housing and having a center pinion, a ring gear fixed in said housing, and a planet pinion effective between said center pinion and ring gear, shafts means carrying said center pinion and having thereadjacent a bearing in said housing, a frame carrying said wheel and said planet pinion and having a bearing on said shaft means between the said bearing of the latter in said housing and said center pinion, said frame and planet pinion parts being arranged to provide removal of said frame without removal of said planet pinion, and said housing having a part removable to permit said frame removal.

6. In a driving axle for a pair of wheels and having a housing, for each wheel a planetary reducing gear carried by said housing and having a center pinion, a ring gear fixed in said housing, and a planet pinion effective between said center pinion and ring gear, shaft means carrying said center pinion and having thereadjacent a bearing in said housing, a frame carrying said wheel and said planet pinion and having a bearing on said shaft means between the said bearing of the latter in said housing and said center pinion, said frame and planet pinion parts being arranged to provide removal of said frame without removal of said planet pinion, and said housing having a part removable to permit said frame removal and carrying said frame housing bearing.

7. In a driving axle for a pair of wheels and having a housing, for each wheel a planetary reducing gear carried by said housing and having a center pinion, a ring gear fixed in said housing, and a planet pinion effective between said center pinion and ring gear, shaft means carrying said center pinion and having thereadjacent a bearing in said housing, a frame carrying said wheel and said planet pinion and having a bearing on said shaft means between the said bearing of the latter in said housing and said center pinion, said frame and planet pinion parts being arranged to provide removal of said frame without removal of said planet pinion, and said housing having a part removable to permit said frame removal and carrying said frame housing bearing and said ring gear.

8. In a driving axle for a pair of wheels and having a housing, for each wheel a reducing gear having an output element connected to the wheel, a fixed element, and an input element arranged for driven connection with the power means by which its wheel is to be driven, brake means associated with said input element, said housing having a part providing a partition between said reducing gear and said brake means, said input element having a bearing in said partition, and said output element having a bearing adjacent said input element bearing.

9. In a driving axle for a pair of wheels and having a housing, for each wheel a reducing gear having an output element connected to the wheel, a fixed element, and an input element arranged for driven connection with the power means by which its wheel is to be driven, brake means associated with said input element, said housing having a part providing a partition between said reducing gear and said brake means, said input element having a bearing in said partition, and said output element having a bearing adjacent said input element bearing and concentric therewith.

10. In a driving axle for a pair of wheels and having a housing, driving differential means, and for each wheel a planetary reducing gear enclosed by said housing and having a center pinion, a ring gear fixed in said housing, and a planet pinion effective between said center pinion and ring gear, a coupling shaft from said driving differential, carrying said center pinion and having thereadjacent a bearing in said housing, a frame carrying said wheel and said planet pinion and having an outer bearing adjacent said wheel and an inner bearing adjacent said coupling shaft bearing.

11. In a driving axle for a pair of wheels and having a housing, for each wheel a reducing gear having an output element connected to the wheel, a fixed element, and an input element arranged for driven connection with the power means by which its wheel is to be driven, said housing having a part providing a bearing support, said input element having a bearing in said support, and said output element having a bearing adjacent said input element bearing.

12. In a driving axle for a pair of wheels and having a housing, for each wheel a reducing gear having an output element connected to the wheel, a fixed element, and an input element arranged for driven connection with the power means by which its wheel is to be driven, said housing having a part providing a bearing support adjacent said reducing gear, said input element having a bearing in said support, and said output element having a bearing adjacent said input element bearing and concentric therewith.

13. In a driving axle for a pair of wheels and having a housing, driving means, and for each wheel a planetary reducing gear enclosed by said housing and having a center pinion, a ring gear fixed in said housing, and a planet pinion effective between said center pinion and ring gear, a coupling shaft from said driving means, carrying said center pinion and having thereadjacent a bearing in said housing, a frame carrying said wheel and said planet pinion and having an outer bearing adjacent said wheel and an inner bearing adjacent said coupling shaft bearing.

ARTHUR P. ARMINGTON.